United States Patent
Zhu et al.

(10) Patent No.: US 12,457,070 B2
(45) Date of Patent: Oct. 28, 2025

(54) UPDATING SOUNDING REFERENCE SIGNAL SPATIAL RELATION INFORMATION

(71) Applicant: LENOVO (BEIJING) LIMITED, Beijing (CN)

(72) Inventors: Chenxi Zhu, Beijing (CN); Bingchao Liu, Beijing (CN); Yi Zhang, Beijing (CN); Wei Ling, Beijing (CN); Lianhai Wu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 625 days.

(21) Appl. No.: 17/794,508

(22) PCT Filed: Jan. 22, 2020

(86) PCT No.: PCT/CN2020/073729
§ 371 (c)(1),
(2) Date: Jul. 21, 2022

(87) PCT Pub. No.: WO2021/146985
PCT Pub. Date: Jul. 29, 2021

(65) Prior Publication Data
US 2023/0048881 A1    Feb. 16, 2023

(51) Int. Cl.
*H04L 5/00*    (2006.01)

(52) U.S. Cl.
CPC .......... *H04L 5/0051* (2013.01); *H04L 5/0044* (2013.01)

(58) Field of Classification Search
CPC ... H04L 5/0051; H04L 5/0044; H04L 5/0094; H04L 5/0023; H04L 5/0048

(Continued)

(56) References Cited

U.S. PATENT DOCUMENTS

| | | | |
|---|---|---|---|
| 2020/0008270 A1 | 1/2020 | Zhang et al. | |
| 2020/0287680 A1* | 9/2020 | Zhou | H04L 5/0051 |
| 2020/0351069 A1* | 11/2020 | Grant | H04L 5/0098 |

FOREIGN PATENT DOCUMENTS

| | | |
|---|---|---|
| CN | 108781152 A | 11/2018 |
| CN | 110034876 A | 7/2019 |

OTHER PUBLICATIONS

IEricsson, "Comparison of MAC CE signalling options for spatial relation update of aperiodic SRS", R1-1907473, May 13-17, 2019. (From Applicant's IDS) (Year: 2019).*

(Continued)

*Primary Examiner* — Mang Hang Yeung
(74) *Attorney, Agent, or Firm* — Kunzler Bean & Adamson

(57) ABSTRACT

Apparatuses, methods, and systems are disclosed for updating SRS spatial relation information. One method includes transmitting first information indicating SRS spatial relation information for an SRS resource. The SRS spatial relation information includes: SRS spatial relation information identifiers; and an SRS spatial relation information reference signal corresponding to each SRS spatial relation information identifier. The method includes transmitting second information indicating an update to the SRS spatial relation information. The second information includes: a serving cell identifier; a bandwidth part identifier; one or more SRS resource identifiers, one or more SRS resource set identifiers, or a combination thereof; and one or more SRS spatial relation information identifiers. Each of the one or more SRS resource identifiers corresponds to each of the one or more SRS spatial relation information identifiers.

20 Claims, 9 Drawing Sheets

(58) Field of Classification Search
USPC .......................................................... 370/329
See application file for complete search history.

(56) References Cited

OTHER PUBLICATIONS

LG Electronics, "Updated feature lead summary of Enhancements on Multi-beam Operations", R1-1905838, Apr. 8-12, 2019. (From Applicant's IDS) (Year: 2019).*
International Searching Authority, "Written Opinion of the International Searching Authority," PCT/CN2020/073729, Oct. 21, 2020, pp. 1-3.
LG Electronics, Discussions on UL Reference Signals for NR Positioning, 3GPP TSG RAN WG1 #99, R1-1912273, Nov. 18-22, 2019, pp. 1-8, Reno, USA.
PCT/CN2020/073729, "Extended European Search Report", European Patent Office, Sep. 19, 2023, pp. 1-11.
LG Electronics, "Updated feature lead summary of Enhancements on Multi-beam Operations", 3GPP TSG RAN WG1 Meeting #96bis R1-1905838, Apr. 8-12, 2019, pp. 1-24.
Ericsson, "Comparison of MAC CE signalling options for spatial relation update of aperiodic SRS", 3GPP TSG-RAN WG1 Meeting #97 Tdoc R1-1907473, May 13-17, 2019, pp. 1-5.
VIVO, "Remaining issues on multi-beam transmission", 3GPP TSG RAN WG1 #99 R1-1912040, Nov. 18-22, 2019, pp. 1-10.

\* cited by examiner

| 602 → | R | | Serving Cell ID | BWP ID |
|---|---|---|---|---|
| 604 → | R | R | SRS Resource ID | |
| 606 → | R | R | SRS-spatialRelationInfo ID | |

FIG. 6

| 702 → | R | | Serving Cell ID | BWP ID |
|---|---|---|---|---|
| 704 → | R | R | SRS Resource ID_0 | |
| 706 → | R | R | SRS-spatialRelationInfo ID_0 | |
| 708 → | R | R | SRS Resource ID_1 | |
| 710 → | R | R | SRS-spatialRelationInfo ID_1 | |

. . .

| 712 → | R | R | SRS Resource ID_(M-1) |
|---|---|---|---|
| 714 → | R | R | SRS-spatialRelationInfo ID_(M-1) |

FIG. 7

UPDATING SOUNDING REFERENCE SIGNAL SPATIAL RELATION INFORMATION

FIELD

The subject matter disclosed herein relates generally to wireless communications and more particularly relates to updating sounding reference signal spatial relation information.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Aperiodic ("AP"), Backhaul ("BH"), Broadcast Multicast ("BM"), Buffer Occupancy ("BO"), Base Station ("BS"), Buffer Status Report ("BSR"), Bandwidth ("BW"), Bandwidth Part ("BWP"), Carrier Aggregation ("CA"), Component Carrier ("CC"), Code Division Multiplexing ("CDM"), Control Element ("CE"), Coordinated Multipoint ("CoMP"), Categories of Requirements ("CoR"), Control Resource Set ("CORESET"), Cyclic Prefix ("CP"), Cyclic Prefix OFDM ("CP-OFDM"), CSI-RS Resource Indicator ("CRI"), Cell RNTI ("C-RNTI"), Channel State Information ("CSI"), CSI IM ("CSI-IM"), CSI RS ("CSI-RS"), Channel Quality Indicator ("CQI"), Central Unit ("CU"), Codeword ("CW"), Downlink Assignment Index ("DAI"), Downlink Control Information ("DCI"), Downlink ("DL"), Discrete Fourier Transform Spread OFDM ("DFT-s-OFDM"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), 450 MHz-6000 MHz ("FR1"), 24250 MHz-52600 MHz ("FR2"), Hybrid Automatic Repeat Request ("HARQ"), High-Definition Multimedia Interface ("HDMI"), Integrated Access Backhaul ("IAB"), Identity or Identifier or Identification ("ID"), Information Element ("IE"), Interference Measurement ("IM"), International Mobile Subscriber Identity ("IMSI"), Internet-of-Things ("IoT"), Internet Protocol ("IP"), Joint Transmission ("JT"), Level 1 ("L1"), L1 RSRP ("L1-RSRP"), L1 SINR ("L1-SINR"), Logical Channel ("LCH"), Logical Channel Group ("LCG"), Logical Channel ID ("LCID"), Logical Channel Prioritization ("LCP"), Layer Indicator ("LI"), Long Term Evolution ("LTE"), Levels of Automation ("LoA"), Medium Access Control ("MAC"), Modulation Coding Scheme ("MCS"), Multi DCI ("M-DCI"), Master Information Block ("MIB"), Multiple Input Multiple Output ("MIMO"), Mobile-Termination ("MT"), Machine Type Communication ("MTC"), Multi PDSCH ("Multi-PDSCH"), Multi TRP ("M-TRP"), Multi-User ("MU"), Multi-User MIMO ("MU-MIMO"), Minimum Mean Square Error ("MMSE"), Negative-Acknowledgment ("NACK") or ("NAK"), Next Generation ("NG"), Next Generation Node B ("gNB"), New Radio ("NR"), Non-Zero Power ("NZP"), NZP CSI-RS ("NZP-CSI-RS"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), PDSCH Configuration ("PDSCH-Config"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PT-RS"), Physical Uplink Control Channel ("PUCCH"), Physical Uplink Shared Channel ("PUSCH"), Quasi Co-Located ("QCL"), Quality of Service ("QoS"), Random Access Channel ("RACH"), Radio Access Network ("RAN"), Radio Access Technology ("RAT"), Resource Element ("RE"), Radio Frequency ("RF"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Reference Signal ("RS"), Reference Signal Received Power ("RSRP"), Reference Signal Received Quality ("RSRQ"), Receive ("RX"), Single Carrier Frequency Domain Spread Spectrum ("SC-FDSS"), Secondary Cell ("SCell"), Sub Carrier Spacing ("SCS"), Single DCI ("S-DCI"), Service Data Unit ("SDU"), Subscriber Identity Module ("SIM"), Signal-to-Interference Ratio ("SINR"), Sidelink ("SL"), Sequence Number ("SN"), Semi Persistent ("SP"), Scheduling Request ("SR"), SRS Resource Indicator ("SRI"), Sounding Reference Signal ("SRS"), Synchronization Signal ("SS"), SS/PBCH Block ("SSB"), Transport Block ("TB"), Transmission Configuration Indicator ("TCI"), Time Division Duplex ("TDD"), Temporary Mobile Subscriber Identity ("TMSI"), Transmitted Precoding Matrix Indicator ("TPMI"), Transmission Reception Point ("TRP"), Technical Standard ("TS"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), LTE Radio Interface ("Uu interface"), User Plane ("UP"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Vehicle RNTI ("V-RNTI"), Worldwide Interoperability for Microwave Access ("WiMAX"), Zero Forcing ("ZF"), Zero Power ("ZP"), and ZP CSI-RS ("ZP-CSI-RS"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, sounding reference signal spatial relation information may be updated.

BRIEF SUMMARY

Methods for updating sounding reference signal spatial relation information are disclosed. Apparatuses and systems also perform the functions of the methods. In one embodiment, the method includes transmitting first information indicating sounding reference signal spatial relation information for a sounding reference signal resource, wherein the sounding reference signal spatial relation information comprises: a plurality of sounding reference signal spatial relation information identifiers; and a sounding reference signal spatial relation information reference signal corresponding to each sounding reference signal spatial relation information identifier of the plurality of sounding reference signal spatial relation information identifiers. In certain embodiments, the method includes transmitting second information indicating an update to the sounding reference signal spatial relation information of the sounding reference signal resource, wherein the second information comprises: a serving cell identifier; a bandwidth part identifier; one or more sounding reference signal resource identifiers, one or more sounding reference signal resource set identifiers, or a combination thereof; and one or more sounding reference signal spatial relation information identifiers of the plurality of sounding reference signal spatial relation information identifiers, wherein each of the one or more sounding reference signal resource identifiers corresponds to each of the one or more sounding reference signal spatial relation information identifiers.

An apparatus for updating sounding reference signal spatial relation information, in one embodiment, includes a transmitter that: transmits first information indicating sounding reference signal spatial relation information for a sounding reference signal resource, wherein the sounding reference signal spatial relation information comprises: a plurality of sounding reference signal spatial relation information identifiers; and a sounding reference signal spatial relation information reference signal corresponding to each sounding reference signal spatial relation information identifier of the plurality of sounding reference signal spatial relation information identifiers; and transmits second information indicating an update to the sounding reference signal spatial relation information of the sounding reference signal resource, wherein the second information comprises: a serving cell identifier; a bandwidth part identifier; one or more sounding reference signal resource identifiers, one or more sounding reference signal resource set identifiers, or a combination thereof; and one or more sounding reference signal spatial relation information identifiers of the plurality of sounding reference signal spatial relation information identifiers, wherein each of the one or more sounding reference signal resource identifiers corresponds to each of the one or more sounding reference signal spatial relation information identifiers.

A method for updating sounding reference signal spatial relation information includes receiving first information indicating sounding reference signal spatial relation information for a sounding reference signal resource, wherein the sounding reference signal spatial relation information comprises: a plurality of sounding reference signal spatial relation information identifiers; and a sounding reference signal spatial relation information reference signal corresponding to each sounding reference signal spatial relation information identifier of the plurality of sounding reference signal spatial relation information identifiers. In some embodiments, the method includes receiving second information indicating an update to the sounding reference signal spatial relation information of the sounding reference signal resource, wherein the second information comprises: a serving cell identifier; a bandwidth part identifier; one or more sounding reference signal resource identifiers, one or more sounding reference signal resource set identifiers, or a combination thereof; and one or more sounding reference signal spatial relation information identifiers of the plurality of sounding reference signal spatial relation information identifiers, wherein each of the one or more sounding reference signal resource identifiers corresponds to each of the one or more sounding reference signal spatial relation information identifiers.

An apparatus for updating sounding reference signal spatial relation information, in one embodiment, includes a receiver that: receives first information indicating sounding reference signal spatial relation information for a sounding reference signal resource, wherein the sounding reference signal spatial relation information comprises: a plurality of sounding reference signal spatial relation information identifiers; and a sounding reference signal spatial relation information reference signal corresponding to each sounding reference signal spatial relation information identifier of the plurality of sounding reference signal spatial relation information identifiers; and receives second information indicating an update to the sounding reference signal spatial relation information of the sounding reference signal resource, wherein the second information comprises: a serving cell identifier; a bandwidth part identifier; one or more sounding reference signal resource identifiers, one or more sounding reference signal resource set identifiers, or a combination thereof; and one or more sounding reference signal spatial relation information identifiers of the plurality of sounding reference signal spatial relation information identifiers, wherein each of the one or more sounding reference signal resource identifiers corresponds to each of the one or more sounding reference signal spatial relation information identifiers.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 is a schematic block diagram illustrating one embodiment of a MAC CE for an SRS resource spatial relation information update;

FIG. 7 is a schematic block diagram illustrating another embodiment of a MAC CE for an SRS resource spatial relation information update;

DETAILED DESCRIPTION

Figure 1:
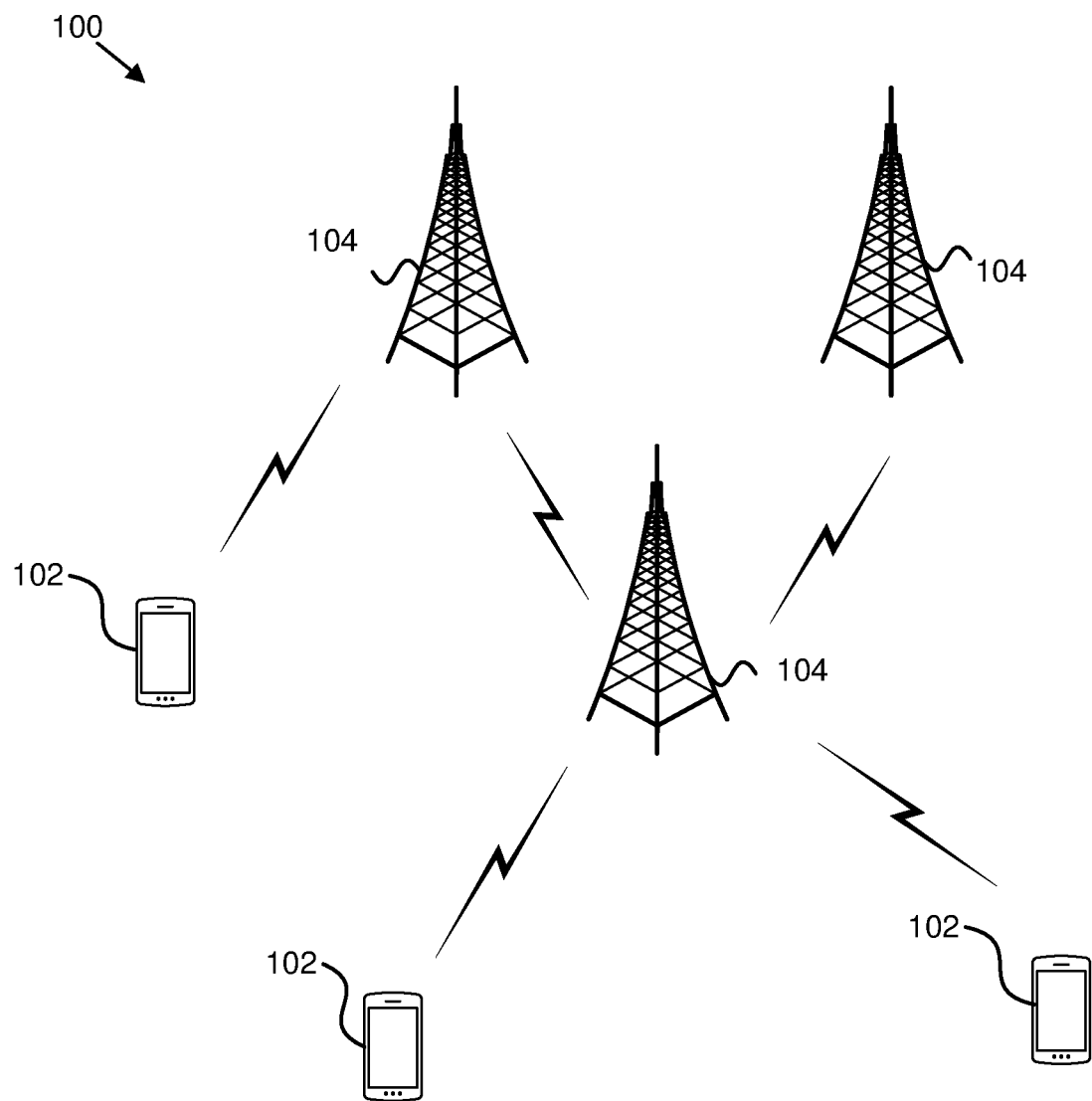
FIG. 1 is a schematic block diagram illustrating one embodiment of a wireless communication system for updating sounding reference signal spatial relation information.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks. The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for updating sounding reference signal spatial relation information. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive first information indicating sounding reference signal spatial relation information for a sounding reference signal resource, wherein the sounding reference signal spatial relation information comprises: a plurality of sounding reference signal spatial relation information identifiers; and a sounding reference signal spatial relation information reference signal corresponding to each sounding reference signal spatial relation information identifier of the plurality of sounding reference signal spatial relation information identifiers. In some embodiments, the remote unit 102 may receive second information indicating an update to the sounding reference signal spatial relation information of the sounding reference signal resource, wherein the second information comprises: a serving cell identifier; a bandwidth part identifier; one or more sounding reference signal resource identifiers, one or more sounding reference signal resource set identifiers, or a combination thereof; and one or more sounding reference signal spatial relation information identifiers of the plurality of sounding reference signal spatial relation information identifiers, wherein each of the one or more sounding reference signal resource identifiers corresponds to each of the one or more sounding reference signal spatial relation information identifiers. Accordingly, a remote unit 102 may be used for updating sounding reference signal spatial relation information.

In some embodiments, a network unit 104 may transmit first information indicating sounding reference signal spatial relation information for a sounding reference signal resource, wherein the sounding reference signal spatial relation information comprises: a plurality of sounding reference signal spatial relation information identifiers; and a sounding reference signal spatial relation information reference signal corresponding to each sounding reference signal spatial relation information identifier of the plurality of sounding reference signal spatial relation information identifiers. In certain embodiments, the network unit 104 may transmit second information indicating an update to the sounding reference signal spatial relation information of the sounding reference signal resource, wherein the second information comprises: a serving cell identifier; a bandwidth part identifier; one or more sounding reference signal resource identifiers, one or more sounding reference signal resource set identifiers, or a combination thereof; and one or more sounding reference signal spatial relation information identifiers of the plurality of sounding reference signal spatial relation information identifiers, wherein each of the one or more sounding reference signal resource identifiers corresponds to each of the one or more sounding reference signal spatial relation information identifiers. Accordingly, a network unit 104 may be used for updating sounding reference signal spatial relation information.

Figure 2:
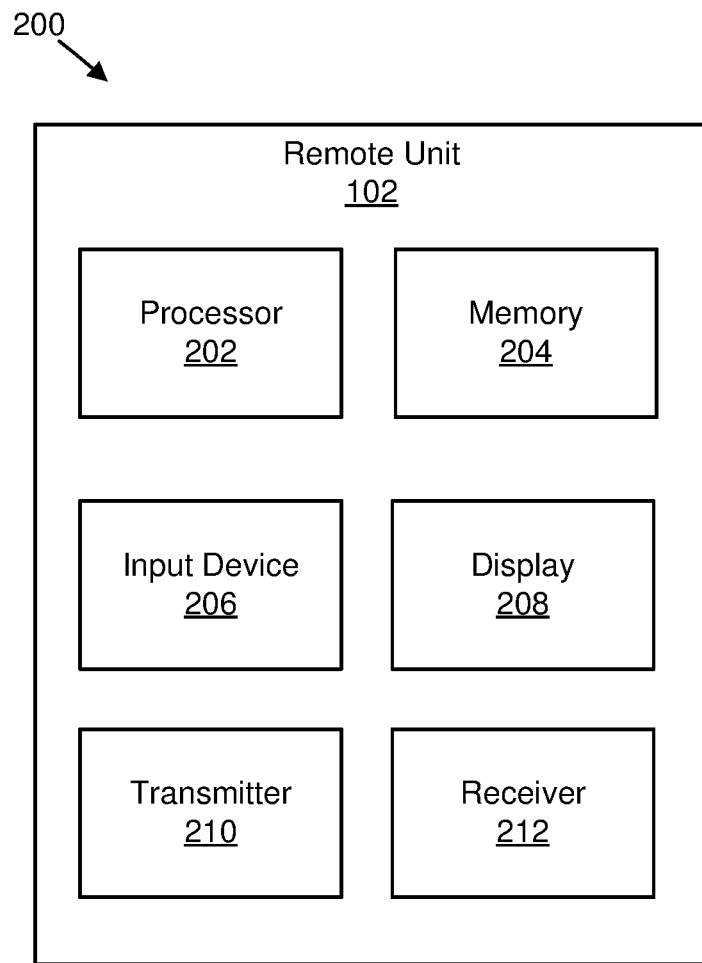
FIG. 2 is a schematic block diagram illustrating one embodiment of an apparatus that may be used for updating sounding reference signal spatial relation information.

FIG. 2 depicts one embodiment of an apparatus 200 that may be used for updating sounding reference signal spatial relation information. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In various embodiments, the receiver 212 may: receive first information indicating sounding reference signal spatial relation information for a sounding reference signal resource, wherein the sounding reference signal spatial relation information comprises: a plurality of sounding reference signal spatial relation information identifiers; and a sounding reference signal spatial relation information reference signal corresponding to each sounding reference signal spatial relation information identifier of the plurality of sounding reference signal spatial relation information identifiers; and receive second information indicating an update to the sounding reference signal spatial relation information of the sounding reference signal resource, wherein the second information comprises: a serving cell identifier; a bandwidth part identifier; one or more sounding reference signal resource identifiers, one or more sounding reference signal resource set identifiers, or a combination thereof; and one or more sounding reference signal spatial relation information identifiers of the plurality of sounding reference signal spatial relation information identifiers, wherein each of the one or more sounding reference signal resource identifiers corresponds to each of the one or more sounding reference signal spatial relation information identifiers. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
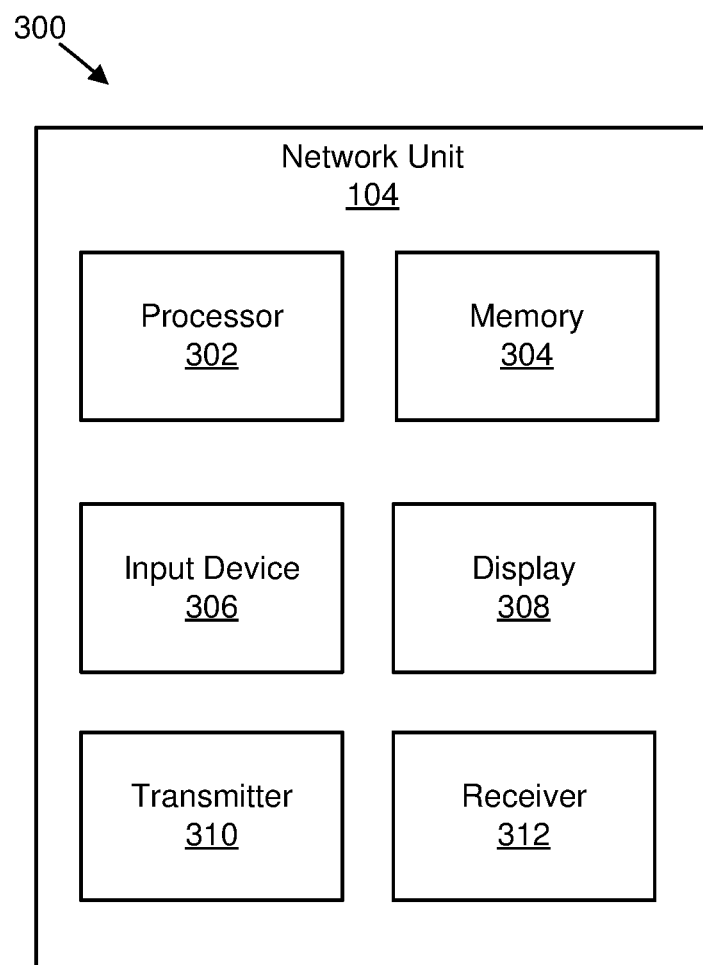
FIG. 3 is a schematic block diagram illustrating one embodiment of an apparatus that may be used for updating sounding reference signal spatial relation information.

FIG. 3 depicts one embodiment of an apparatus 300 that may be used for updating sounding reference signal spatial relation information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may: transmit first information indicating sounding reference signal spatial relation information for a sounding reference signal resource, wherein the sounding reference signal spatial relation information comprises: a plurality of sounding reference signal spatial relation information identifiers; and a sounding reference signal spatial relation information reference signal corresponding to each sounding reference signal spatial relation information identifier of the plurality of sounding reference signal spatial relation information identifiers; and transmit second information indicating an update to the sounding reference signal spatial relation information of the sounding reference signal resource, wherein the second information comprises: a serving cell identifier; a bandwidth part identifier; one or more sounding reference signal resource identifiers, one or more sounding reference signal resource set identifiers, or a combination thereof; and one or more sounding reference signal spatial relation information identifiers of the plurality of sounding reference signal spatial relation information identifiers, wherein each of the one or more sounding reference signal resource identifiers corresponds to each of the one or more sounding reference signal spatial relation information identifiers. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, every SRS resource may be configured with a spatialRelationInfo field through RRC. The spatialRelationInfo field may indicate to a UE which TX beam to use for transmitting a corresponding SRS resource. The spatialRelationInfo for an SRS resource may be an index that indicates a CSI-RS, an SSB, or another SRS. If a gNB wants the UE to change the TX beam of an SRS resource, the gNB may update the spatialRelationInfo by sending an RRC message. As may be appreciated, sending an RRC message to update spatialRelationInfo may take a long time and the gNB may not be able to switch the TX beam of an SRS resource quickly. For semi-persistent SRS, activation and deactivation for an SRS resource set may be triggered by a MAC CE. During activation, all of the SRS resources within the SRS resource set may be configured with spatialRelationInfo. However, this may be limited to only SP SRS.

In various embodiments, a MAC CE may be used for quickly updating spatialRelationInfo for SRS resources. In some embodiments, a UE may be configured with up to 64 spatialRelationInfos, and a gNB may quickly update a TX beam of an aperiodic or semi-persistent SRS using a MAC CE. To facilitate intra-band CA operation, if multiple carriers within a same band share the same TX beam, a same spatialRelationInfo may be shared across multiple carriers in different SRS resources for the same usage. The common spatialRelationInfo for these SRS resources in different CCs or in different BWPs of the same carrier may also be quickly updated with a MAC-CE. In certain embodiments, up to 2 carrier lists may be configured for this purpose.

In certain embodiments, spatial relation information (e.g., spatialRelationInfo) for an SRS resource may be configured using an RRC message, such as the RRC message found in Table 1.

TABLE 1

Spatial Relation Info Configuration for SRS with RRC Message

```
-- ASN1START
-- TAG-SRS-CONFIG-START
SRS-Config ::=                    SEQUENCE {
    srs-ResourceSetToReleaseList          SEQUENCE (SIZE(1..maxNrofSRS-ResourceSets)) OF SRS-ResourceSetId
OPTIONAL, -- Need N
    srs-ResourceSetToAddModList           SEQUENCE (SIZE(1..maxNrofSRS-ResourceSets)) OF SRS-ResourceSet
OPTIONAL, -- Need N
    srs-ResourceToReleaseList             SEQUENCE (SIZE(1..maxNrofSRS-Resources)) OF SRS-ResourceId      OPTIONAL,
-- Need N
    srs-ResourceToAddModList              SEQUENCE (SIZE(1..maxNrofSRS-Resources)) OF SRS-Resource        OPTIONAL,
-- Need N
    tpc-Accumulation                  ENUMERATED {disabled}                OPTIONAL, -- Need S
    ...
}
SRS-ResourceSet ::=               SEQUENCE {
    srs-ResourceSetId                 SRS-ResourceSetId,
    srs-ResourceIdList                SEQUENCE (SIZE(1..maxNrofSRS-ResourcesPerSet)) OF SRS-ResourceId    OPTIONAL, --
Cond Setup
```

TABLE 1-continued

Spatial Relation Info Configuration for SRS with RRC Message

```
    resourceType                           CHOICE {
        aperiodic                          SEQUENCE {
            aperiodicSRS-ResourceTrigger       INTEGER (1..maxNrofSRS-TriggerStates-1),
            csi-RS                             NZP-CSI-RS-ResourceId              OPTIONAL, -- Cond NonCodebook
            slotOffset                         INTEGER (1..32)                    OPTIONAL, -- Need S
            ...,
            [[
            aperiodicSRS-Resource TriggerList-v1530    SEQUENCE (SIZE(1..maxNrofSRS-TriggerStates-2))
                                               OF INTEGER (1..maxNrofSRS-TriggerStates-1)    OPTIONAL -- Need M
            ]]
        },
        semi-persistent                    SEQUENCE {
            associatedCSI-RS                   NZP-CSI-RS-ResourceId              OPTIONAL, -- Cond NonCodebook
            ...
        },
        periodic                           SEQUENCE {
            associatedCSI-RS                   NZP-CSI-RS-ResourceId              OPTIONAL, -- Cond NonCodebook
            ...
        }
    },
    usage                                  ENUMERATED {beamManagement, codebook, nonCodebook, antennaSwitching},
    alpha                                  Alpha                              OPTIONAL, -- Need S
    p0                                     INTEGER (-202..24)                 OPTIONAL, -- Cond Setup
    pathlossReferenceRS                    CHOICE {
        ssb-Index                              SSB-Index,
        csi-RS-Index                           NZP-CSI-RS-ResourceId
    }                                      OPTIONAL, -- Need M
    srs-PowerControlAdjustmentStates           ENUMERATED { sameAsFci2, separateClosedLoop}    OPTIONAL, -- Need S
    ...
}
SRS-ResourceSetId ::=                      INTEGER (0..maxNrofSRS-ResourceSets-1)
SRS-Resource ::=                           SEQUENCE {
    srs-ResourceId                             SRS-ResourceId,
    nrofSRS-Ports                              ENUMERATED {port1, ports2, ports4},
    ptrs-PortIndex                             ENUMERATED {n0, n1 }               OPTIONAL, -- Need R
    transmissionComb                           CHOICE {
        n2                                 SEQUENCE {
            combOffset-n2                          INTEGER (0..1),
            cyclicShift-n2                         INTEGER (0..7)
        },
        n4                                 SEQUENCE {
            combOffset-n4                          INTEGER (0..3),
            cyclicShift-n4                         INTEGER (0..11)
        }
    },
    resourceMapping                            SEQUENCE {
        startPosition                          INTEGER (0..5),
        nrofSymbols                            ENUMERATED {n1, n2, n4},
        repetitionFactor                       ENUMERATED {n1, n2, n4}
    },
    freqDomainPosition                         INTEGER (0..67),
    freqDomainShift                            INTEGER (0..268),
    freqHopping                                SEQUENCE {
        c-SRS                                  INTEGER (0..63),
        b-SRS                                  INTEGER (0..3),
        b-hop                                  INTEGER (0..3)
    },
    groupOrSequenceHopping                     ENUMERATED { neither, groupHopping, sequenceHopping },
    resourceType                           CHOICE {
        aperiodic                          SEQUENCE {
            ...
        },
        semi-persistent                    SEQUENCE {
            periodicityAndOffset-sp                SRS-Periodicity AndOffset,
            ...
        },
        periodic                           SEQUENCE {
            periodicityAndOffset-p                 SRS-Periodicity AndOffset,
            ...
        }
    },
    sequenceId                                 INTEGER (0..1023),
    spatialRelationInfo                        SRS-SpatialRelationInfo            OPTIONAL, -- Need R
    ...
}
SRS-SpatialRelationInfo ::=                SEQUENCE {
    servingCellId                              ServCellIndex                      OPTIONAL, -- Need S
    referenceSignal                            CHOICE {
```

TABLE 1-continued

Spatial Relation Info Configuration for SRS with RRC Message

```
    ssb-Index                    SSB-Index,
    csi-RS-Index                 NZP-CSI-RS-ResourceId,
    srs                          SEQUENCE {
      resourceId                    SRS-ResourceId,
      uplinkBWP                     BWP-Id
    }
  }
}
-- TAG-SRS-CONFIG-STOP
-- ASN1STOP
```

In various embodiments, spatial relation information for PUCCH may be updated (e.g., activated and/or deactivated) with MAC CE, such as the MAC CE found in Table 2.

TABLE 2

Spatial Relation Info Update for PUCCH with MAC CE

1. Activation/Deactivation of spatial relation of PUCCH resource
A network may activate and deactivate a spatial relation for a PUCCH resource of a Serving Cell by sending a PUCCH spatial relation Activation/Deactivation MAC CE.
The MAC entity shall:
    1> if the MAC entity receives a PUCCH spatial relation Activation/Deactivation MAC CE on a Serving Cell:
        2> indicate to lower layers the information regarding the PUCCH spatial relation
        Activation/Deactivation MAC CE.
    2. PUCCH spatial relation Activation/Deactivation MAC CE
The PUCCH spatial relation Activation/Deactivation MAC CE is identified by a MAC PDU subheader with LCID. It has a fixed size of 24 bits with following fields:
Serving Cell ID: This field indicates the identity of the Serving Cell for which the MAC CE applies. The length of the field is 5 bits;
BWP ID: This field indicates a UL BWP for which the MAC CE applies as the codepoint of the DCI bandwidth part indicator field. The length of the BWP ID field is 2 bits;
PUCCH Resource ID: This field contains an identifier of the PUCCH resource ID identified by PUCCH-ResourceId. The length of the field is 7 bits;
Si: If there is a PUCCH Spatial Relation Info with PUCCH-SpatialRelationInfoId i, configured for the uplink bandwidth part indicated by BWP ID field, Si indicates the activation status of PUCCH Spatial Relation Info with PUCCH-SpatialRelationInfoId i, otherwise MAC entity shall ignore this field. The Si field is set to "1" to indicate PUCCH Spatial Relation Info with PUCCH-SpatialRelationInfoId i should be . The Si field is set to "0" to indicate PUCCH Spatial Relation Info with PUCCH-SpatialRelationInfoId i should be deactivated. Only a single PUCCH Spatial Relation Info can be active for a PUCCH Resource at a time;
R: Reserved bit, set to "0".

Figure 4:
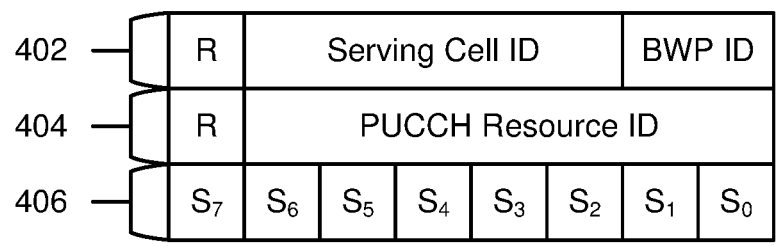
FIG. 4 is a schematic block diagram illustrating one embodiment of a MAC CE for a PUCCH spatial relation activation and/or deactivation.

FIG. 4 is a schematic block diagram illustrating one embodiment of a MAC CE 400 for a PUCCH spatial relation activation and/or deactivation corresponding to Table 2. The v MAC CE 400 includes a first octet 402, a second octet 404, and a third octet 406 containing elements as described in Table 2. Each of the first octet 402, the second octet 404, and the third octet 406 includes eight bits. The first octet 402 includes a reserved bit R, a serving cell ID (5 bits), and a BWP ID (2 bits). The second octet 404 includes a reserved bit R and a PUCCH resource ID (7 bits). The third octet 406 includes eight Si bits $S_7$, $S_6$, $S_5$, $S_4$, $S_3$, $S_2$, $S_1$, and $S_0$ as described in Table 2.

In some embodiments, spatialRelationInfo for semi-persistent SRS resources within an SRS resource set may be configured during activation with a MAC CE, such as the MAC CE found in Table 3.

TABLE 3

SP SRS Activation/Deactivation MAC CE

The SP SRS Activation/Deactivation MAC CE is identified by a MAC subheader with LCID. It has a variable size with following fields:
A/D: This field indicates whether to activate or deactivate indicated SP SRS resource set. The field is set to 1 to indicate activation, otherwise it indicates deactivation;
SRS Resource Set's Cell ID: This field indicates the identity of the Serving Cell, which contains activated/deactivated SP SRS Resource Set. If the C field is set to 0, this field also indicates the identity of the Serving Cell which contains all resources indicated by the Resource ID$_i$ fields. The length of the field is 5 bits;
SRS Resource Set's BWP ID: This field indicates a UL BWP as the codepoint of the DCI bandwidth part indicator field, which contains activated/deactivated SP SRS Resource Set. If the C field is set to 0, this field also indicates the identity of the BWP which contains all resources indicated by the Resource ID$_i$ fields. The length of the field is 2 bits;
C: This field indicates whether the octets containing Resource Serving Cell ID field(s) and Resource BWP ID field(s) are present. If this field is set to 1, the octets containing Resource Serving Cell ID TABLE 3-continued SP SRS Activation/Deactivation MAC CE field(s) and Resource BWP ID field(s) are present, otherwise they are not present;
SUL: This field indicates whether the MAC CE applies to the NUL carrier or SUL carrier configuration. This field is set to 1 to indicate that it applies to the SUL carrier configuration, and it is set to 0 to indicate that it applies to the NUL carrier configuration;
SP SRS Resource Set ID: This field indicates the SP SRS Resource Set ID identified by SRS-ResourceSetId, which is to be activated or deactivated. The length of the field is 4 bits;
$F_i$: This field indicates the type of a resource used as a spatial relationship for SRS resource within SP SRS Resource Set indicated with SP SRS Resource Set ID field. $F_0$ refers to the first SRS resource within the resource set, $F_1$ to the second one and so on. The field is set to 1 to indicate NZP CSI-RS resource index is used, and it is set to 0 to indicate either SSB index or SRS resource index is used. The length of the field is 1 bit. This field is only present if MAC CE is used for activation, i.e. the A/D field is set to 1;
Resource $ID_i$: This field contains an identifier of the resource used for spatial relationship derivation for SRS resource i. Resource $ID_0$ refers to the first SRS resource within the resource set, Resource $ID_1$ to the second one and so on. If $F_i$ is set to 0, and the first bit of this field is set to 1, the remainder of this field contains SSB-Index. If $F_i$ is set to 0, and the first bit of this field is set to 0, the remainder of this field contains SRS-ResourceId. The length of the field is 7 bits. This field is only present if MAC CE is used for activation, i.e. the A/D field is set to 1;
Resource Serving Cell $ID_i$: This field indicates the identity of the Serving Cell on which the resource used for spatial relationship derivation for SRS resource i is located. The length of the field is 5 bits;
Resource BWP $ID_i$: This field indicates a UL BWP as the codepoint of the DCI bandwidth part indicator field, on which the resource used for spatial relationship derivation for SRS resource i is located. The length of the field is 2 bits;
R: Reserved bit, set to 0.

Figure 5:
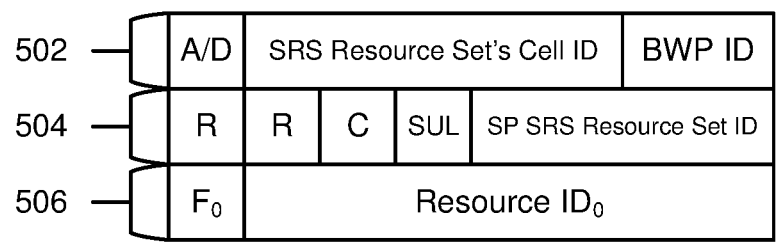
FIG. 5 is a schematic block diagram illustrating one embodiment of a MAC CE for an SP SRS activation and/or deactivation.
Figure 5:
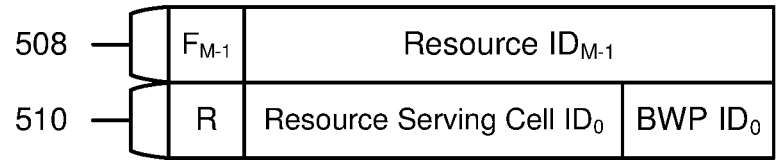
Figure 5:
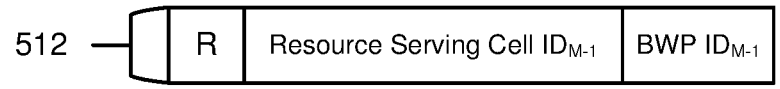

FIG. 5 is a schematic block diagram illustrating one embodiment of a MAC CE 500 for an SP SRS activation and/or deactivation corresponding to Table 3. The MAC CE 500 includes a first octet 502, a second octet 504, a third octet 506, a fourth octet 508, a fifth octet 510, and a sixth octet 512 with additional octets as needed containing elements as described in Table 3. Each of the first octet 502, the second octet 504, the third octet 506, the fourth octet 508, the fifth octet 510, and the sixth octet 512 includes eight bits. The first octet 502 includes an AID bit, an SRS resource set's cell ID (5 bits), and a BWP ID (2 bits) (e.g., SRS resource set's BWP ID). The second octet 504 includes two reserved bits R, a C bit, an SUL bit, and an SP SRS resource set ID (4 bits). The third octet 506 includes an Fi bit $F_0$ and a resource IDi (7 bits) (e.g., resource $ID_0$). The fourth octet 508 includes an Fi bit $F_{M-1}$ and a resource IDi (7 bits) (e.g., resource $ID_{M-1}$). The fifth octet 510 includes a reserved bit, a resource serving cell IDi (5 bits) (e.g., resource serving cell $ID_0$), and a BWP IDi (2 bits) (e.g., BWP $ID_0$, resource BWP $ID_0$). The sixth octet 512 includes a reserved bit, a resource serving cell IDi (5 bits) (e.g., resource serving cell $ID_{M-1}$), and a BWP IDi (2 bits) (e.g., BWP $ID_{M-1}$, resource BWP $ID_{M-1}$).

In certain embodiments, an SRS resource spatialRelation-Info MAC-CE may be used to: update spatial relation information for individual AP SRS; and update spatial relation information for AP and/or SP SRS in multiple CCs and/or BWPs. In such embodiments, the MAC CE may be identified by a MAC PDU sub-header with a dedicate LCID. One embodiment of the MAC CE is illustrated in FIG. 6.

FIG. 6 is a schematic block diagram illustrating one embodiment of a MAC CE 600 for an SRS resource spatial relation information update. The MAC CE 600 includes a first octet 602, a second octet 604, and a third octet 606. Each of the first octet 602, the second octet 604, and the third octet 606 includes eight bits. The first octet 602 includes a reserved bit R, a serving cell ID (5 bits), and a BWP ID (2 bits). The second octet 604 includes two reserved bits R and an SRS resource ID (6 bits). The third octet 606 includes two reserved bits R and an SRS-spatialRelationInfo ID (6 bits).

The fields of the MAC CE 600 of FIG. 6 may be defined as follows: 1) serving cell ID: this field may indicate an identity of the serving cell of an SRS resource for which the MAC CE applies—the length of the field is 5 bits; 2) BWP ID: this field may indicate an UL BWP for which the MAC CE applies as a codepoint of a DCI bandwidth part indicator field—the length of the BWP ID field is 2 bits; 3) SRS resource ID: this field may indicate an ID of the SRS resource—it may be one of the SRS resource IDs configured in SRS-Config by RRC and the length of this field is 6 bits; and 4) SRS-spatialRelationInfo ID: this may identify an ID of the SRS-spatialRelationInfo that applies to the SRS resource specified by the SRS resource ID.

In various embodiments, upon receiving the MAC CE 600 of FIG. 6, a UE updates spatial relation information of an SRS resource of the corresponding (e.g., indicated by serving cell ID, BWP ID, and SRS resource ID) spatial relation information indicated by the SRS-spatialRelation-Info ID.

In some embodiments, updating spatialRelationInfo of all SRS with the same SRS resource ID in all the BWPs of all the configured CCs in a list may be done implicitly. In certain embodiments, if SimultaenousSpatialRelationCell-List i (i=0 or 1) is configured by RRC and includes a serving cell ID of a MAC CE, spatialRelationInfo of all SRS resources with all matching SRS resource IDs in the BWPs of all CCs in the SimultaenousSpatialRelationCellList are updated to the SRS-spatialRelationInfo ID. In such embodiments, the SRS resource may be AP or SP. Further, in such embodiments RRC may configure a UE with up to 2 lists of SimultaenousSpatialRelationCellList (e.g., 0, 1). If no list is configured, or the serving cell ID is not included in the list, no spatialRelationInfo of any SRS resources in other CCs are updated.

In various embodiments, spatialRelationInfo may be configured for a resource, not for a resource set. In some embodiments, multiple SRS resources in different CCs may be updated together if a CC list SimultaenousSpatialRelationCellList is configured.

In certain embodiments, an SRS-spatialRelationInfo IE may be defined as shown in Table 4.

TABLE 4

SRS-SpatialRelationInfo IE

```
-- ASN1START
-- TAG-SRS-SPATIALRELATIONINFO-START
SRS-SpatialRelationInfo ::=         SEQUENCE {
   srs-SpatialRelationInfoId        srs-SpatialRelationInfoId,
   servingCellId                    ServCellIndex              OPTIONAL, -- Need S
   referenceSignal                  CHOICE {
      ssb-Index                        SSB-Index,
      csi-RS-Index                     NZP-CSI-RS-ResourceId,
      srs                           SEQUENCE {
                                       resource    SRS-ResourceId,
                                       uplinkBWP   BWP-Id
                                    }
   },
}
SRS-SpatialRelationInfoId ::=  INTEGER (1..maxNrofSRSSpatialRelationInfos)
-- TAG-SRS-SPATIALRELATIONINFO-STOP
-- ASN1STOP
```

The MAC CE 600 of FIG. 6 may be used to update spatialRelationInfo for multiple SRS resources within a same CC and BWP, and if SimultaenousSpatialRelationCellList i is configured and includes a serving cell ID, all SRS resources with the same SRS resource ID in the other CCs in the same list may be updated with the same spatialRelationInfo.

In one embodiment described in relation to FIG. 7, a MAC CE may include multiple pairs of SRS resource IDs and SRS-spatialRelationInfo IDs.

Specifically, FIG. 7 is a schematic block diagram illustrating another embodiment of a MAC CE 700 for an SRS resource spatial relation information update. The MAC CE 700 includes a first octet 702, a second octet 704, a third octet 706, a fourth octet 708, a fifth octet 710, a sixth octet 712, and a seventh octet 714 with additional octets as needed. Each of the first octet 702, the second octet 704, the third octet 706, the fourth octet 708, the fifth octet 710, the sixth octet 712, and the seventh octet 714 includes eight bits. The first octet 702 includes a reserved bit R, a serving cell ID (5 bits), and a BWP ID (2 bits). The second octet 704 includes two reserved bits R and an SRS resource ID_0 (6 bits). The third octet 706 includes two reserved bits R and an SRS-spatialRelationInfo ID_0 (6 bits). The fourth octet 708 includes two reserved bits R and an SRS resource ID_1 (6 bits). The fifth octet 710 includes two reserved bits R and an SRS-spatialRelationInfo ID_1 (6 bits). The sixth octet 712 includes two reserved bits R and an SRS resource ID_(M−1) (6 bits). The seventh octet 714 includes two reserved bits R and an SRS-spatialRelationInfo ID_(M−1) (6 bits). As may be appreciated, there may be up to M SRS resources updated with M SRS-spatialRelationInfo.

Figure 8:
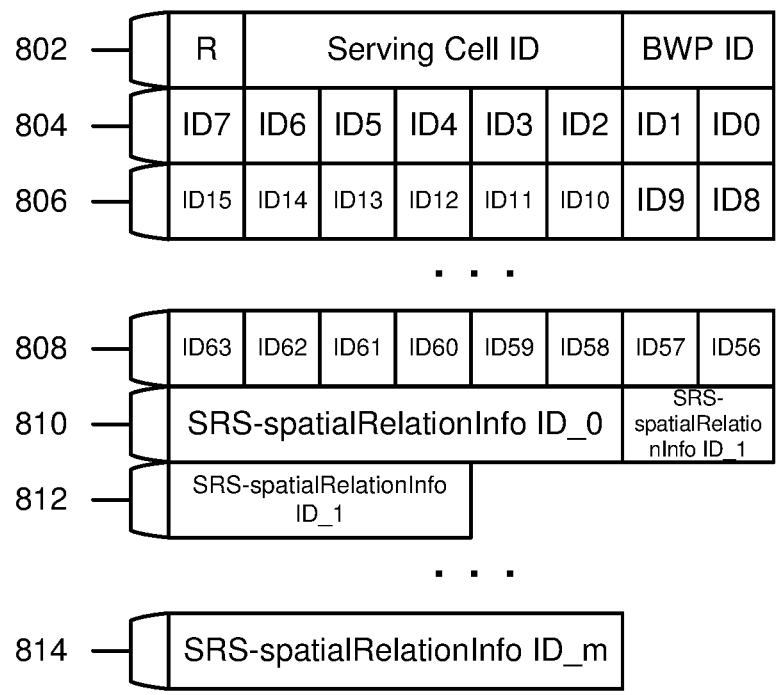
FIG. 8 is a schematic block diagram illustrating a further embodiment of a MAC CE for an SRS resource spatial relation information update.

In another embodiment described in relation to FIG. 8, a MAC CE may use a bitmap that indicates SRS resources to be updated with corresponding spatialRelationInfo.

Specifically, FIG. 8 is a schematic block diagram illustrating a further embodiment of a MAC CE 800 for an SRS resource spatial relation information update. The MAC CE 800 includes a first octet 802, a second octet 804, a third octet 806, a fourth octet 808, a fifth octet 810, a sixth octet 812, and a seventh octet 814 with additional octets as needed. Each of the first octet 802, the second octet 804, the third octet 806, the fourth octet 808, the fifth octet 810, the sixth octet 812, and the seventh octet 814 includes eight bits. The first octet 802 includes a reserved bit R, a serving cell ID (5 bits), and a BWP ID (2 bits). The second octet 804 includes eight ID bits that are part of a 64-bit bitmap with each bit corresponding to one SRS resource ID. The third octet 806 includes eight additional ID bits that are part of the 64-bit bitmap. The fourth octet 808 includes eight additional ID bits that are part of the 64-bit bitmap. As may be appreciated, the unlisted ID bits that are part of the 64-bit bitmap are indicated by the dots between the third octet 806 and the fourth octet 808. The fifth octet 810 includes an SRS-spatialRelationInfo ID_0 (6 bits) and the first two bits of a six-bit SRS-spatialRelationInfo ID_1. SRS-spatialRelationInfo ID_0 corresponds to the first SRS resource ID indicated to be updated by the 64-bit bitmap (e.g., a "0" in the bitmap indicates that the SRS resource ID is not to be updated, and a "1" in the bitmap indicates that the SRS resource ID is to be updated). SRS-spatialRelationInfo ID_1 corresponds to the second SRS resource ID indicated to be updated by the 64-bit bitmap. The sixth octet 812 includes the remaining 4 bits of the six-bit SRS-spatialRelationInfo ID_1. The seventh octet 814 includes the 6 bits of a six-bit SRS-spatialRelationInfo ID_m. SRS-spatialRelationInfo ID_m corresponds to the mth (e.g., M−1) SRS resource ID indicated to be updated by the 64-bit bitmap. SRS-spatialRelationInfo for M SRS resource IDs may be updated as indicated by the dots between the sixth octet 812 and the seventh octet 814.

For the 64-bit bitmap, an i-th bit corresponds to SRS resource ID i. Bit i is set to 1 if the spatialRelationInfo of SRS resource i is updated by the MAC CE 800, and otherwise set to 0. If there are total M SRS resources to have their spatialRelationInfo updated, there are M is in the bitmap, and M SRS spatialRelationInfo ID appended after the bitmap, each corresponding to a SRS resource indicated by a 1 in the bitmap.

In various embodiments, for an SRS resource set with usage set to noncodebook, up to 4 SRS resources may be configured for up to rank 4 PUSCH transmission. These SRS resources may be used as DMRS ports for noncodebook based PUSCH transmission. If multiple SRS resources are used together in a noncodebook based PUSCH, they may be configured with the same pathloss reference RS and the same spatialRelationInfo. In some embodiments, a pathloss reference RS for SRS may be configured per resource set; therefore, SRS resources in a same SRS resource set may have the same pathloss reference RS. In certain embodiments, spatialRelationInfo for SRS may be configured per SRS resource. For the SRS resources for noncodebook PUSCH transmission, their spatialRelationInfo may be configured separately per resource to the same value by RRC.

This may be time consuming and may inhibit quick beam switching for noncodebook based PUSCH transmission.

In some embodiments, to expedite configuration and/or reconfiguration of spatialRelationInfo for SRS resources with a usage set to noncodebook, an SRS resource set based spatialRelationInfo update may be used. For example, spatialRelationInfo for all SRS resources within an SRS resource set may be updated using a single MAC CE. As another example, a MAC CE with and additional updating rule may be used.

In various embodiments, such as for multi-TRP PUSCH, multiple noncodebook SRS resource sets may be configured for a UE. In such embodiments, each SRS resource set may be used for transmission to a TRP.

Figure 9:
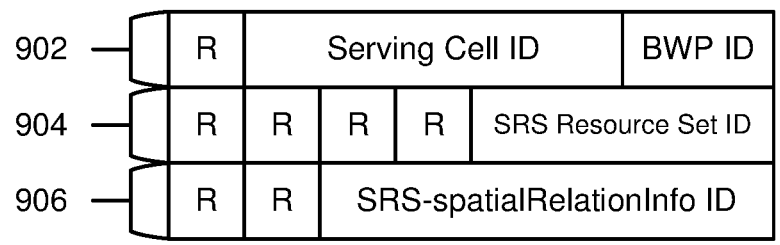
FIG. 9 is a schematic block diagram illustrating one embodiment of a MAC CE for an SRS resource set spatial relation information update.

In certain embodiments, such as described in relation to FIG. 9, a MAC CE may be used to update spatialRelationInfo for all SRS resources within an SRS resource set. Such embodiments may also be used to update multiple SRS resources in other CCs. The MAC CE may be identified by a MAC PDU sub-header with a dedicate LCID.

FIG. 9 is a schematic block diagram illustrating one embodiment of a MAC CE 900 for an SRS resource set spatial relation information update. The MAC CE 900 includes a first octet 902, a second octet 904, and a third octet 906. Each of the first octet 902, the second octet 904, and the third octet 906 includes eight bits. The first octet 902 includes a reserved bit R, a serving cell ID (5 bits), and a BWP ID (2 bits). The second octet 904 includes four reserved bits R and an SRS resource set ID (4 bits). The third octet 906 includes two reserved bits R and an SRS-spatialRelationInfo ID (6 bits).

The fields of the MAC CE 900 of FIG. 9 may be defined as follows: 1) serving cell ID: this field may indicate an identity of the serving cell of an SRS resource for which the MAC CE applies—the length of the field is 5 bits; 2) BWP ID: this field may indicate an UL BWP for which the MAC CE applies as the codepoint of a DCI bandwidth part indicator field—the length of the BWP ID field is 2 bits; 3) SRS resource set ID: this field may indicate an ID of an SRS resource set—it may be one of the SRS resource set IDs configured in SRS-Congfig by RRC and the length of this field is 4 bits; and 4) SRS-spatialRelationInfo ID: this may identify an ID of the SRS-spatialRelationInfo that applies to the SRS resource set specified by SRS resource set ID.

In some embodiments, upon receiving the MAC CE 900, a UE updates spatial relation information of all SRS resources within an SRS resource set of corresponding (e.g., indicated by serving cell ID, BWP ID, and SRS resource set ID) spatial relation information indicated by an SRS-spatialRelationInfo ID.

In certain embodiments, if SimultaenousSpatialRelationCellList i (i=0 or 1) is configured by RRC and includes a serving cell ID of a MAC CE, spatialRelationInfo of all SRS resources within an SRS resource set with all matching SRS resource ID in all BWPs of all CCs in the SimultaenousSpatialRelationCellList are updated to the SRS-spatialRelationInfo ID. In such embodiments, the SRS resource may be AP or SP. Further, in such embodiments RRC may configure a UE with up to 2 lists of SimultaenousSpatialRelationCellList (e.g., 0, 1). If no list is configured, or the serving cell ID is not included in the list, no spatialRelationInfo of any SRS resources in other CCs are updated.

In various embodiments, for a SRS resource set with a usage set to codebook, up to two SRS resources may be configured. These two SRS resources may or may not have the same spatialRelationInfo. If they share the same spatialRelationInfo, a gNB may also use a MAC CE to configure their spatialRelationInfo together.

In some embodiments, the same patialRelationInfo may be configured for all resources within an SRS resource set (e.g., resources in the resource set that are not configured individually). In certain embodiments, multiple SRS resources in different CCs may be updated together if a CC list SimultaenousSpatialRelationCellList is configured.

In certain embodiments, a MAC CE may be used to update a spatial relationship for all SRS resources in multiple SRS resource sets and/or multiple CCs if at least one SimultaenousSpatialRelationCellList is configured. In some embodiments, the IDs of multiple SRS resource sets may be included in the same MAC CE if the IDs of the SRS resource sets may be indicated fully (e.g., via 4 bits) and/or indicated with a bitmap of length 16 (e.g., the length may be configured by maxNrofSRS-ResourceSets).

Figure 10:
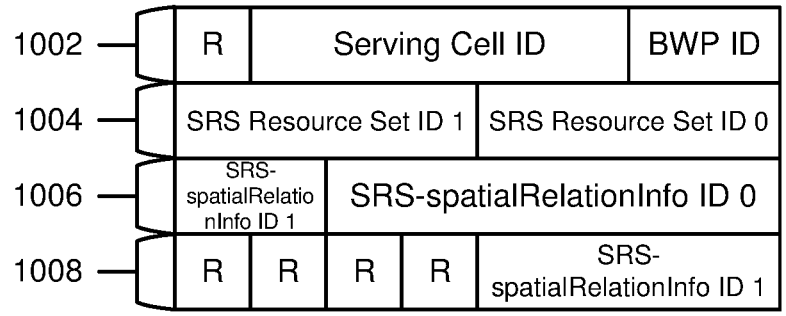
FIG. 10 is a schematic block diagram illustrating another embodiment of a MAC CE for an SRS resource set spatial relation information update.

FIG. 10 is a schematic block diagram illustrating another embodiment of a MAC CE 1000 for an SRS resource set spatial relation information update. The MAC CE 1000 includes a first octet 1002, a second octet 1004, a third octet 1006, and a fourth octet 1008 with additional octets as needed. Each of the first octet 1002, the second octet 1004, the third octet 1006, and the fourth octet 1008 includes eight bits. The first octet 1002 includes a reserved bit R, a serving cell ID (5 bits), and a BWP ID (2 bits). The second octet 1004 includes an SRS resource set ID 1 (4 bits) and an SRS resource set ID 0 (4 bits). The third octet 1006 includes the first two bits of a six-bit SRS-spatialRelationInfo ID 1 and an SRS-spatialRelationInfo ID 0 (6 bits). SRS-spatialRelationInfo ID 0 corresponds to the SRS resource set ID 0. SRS-spatialRelationInfo ID 1 corresponds to the SRS resource ID 1. The fourth octet 1008 includes four reserved bits R and the remaining 4 bits of the six-bit SRS-spatialRelationInfo ID 1.

Figure 11:
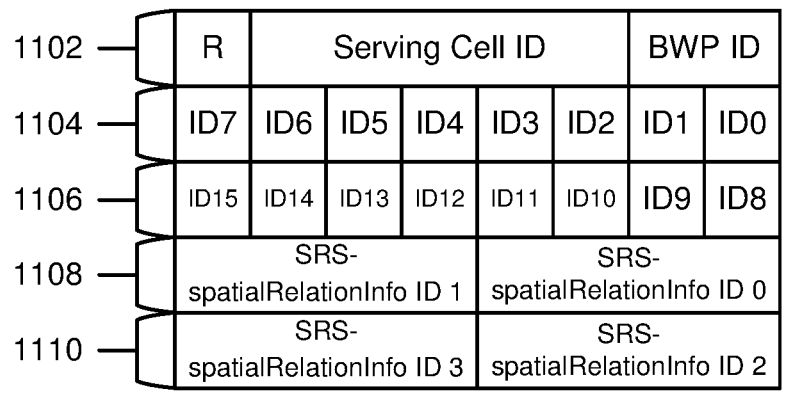
FIG. 11 is a schematic block diagram illustrating a further embodiment of a MAC CE for an SRS resource set spatial relation information update.

FIG. 11 is a schematic block diagram illustrating a further embodiment of a MAC CE 1100 for an SRS resource set spatial relation information update. The MAC CE 1100 includes a first octet 1102, a second octet 1104, a third octet 1106, a fourth octet 1108, and a fifth octet 1110 with additional octets as needed. Each of the first octet 1102, the second octet 1104, the third octet 1106, the fourth octet 1108, and the fifth octet 1110 includes eight bits. The first octet 1102 includes a reserved bit R, a serving cell ID (5 bits), and a BWP ID (2 bits). The second octet 1104 includes eight ID bits that are part of a 16-bit bitmap with each bit corresponding to one SRS resource set ID. The third octet 1106 includes eight additional ID bits that are part of the 16-bit bitmap. The fourth octet 1108 includes an SRS-spatialRelationInfo ID 1 (4 bits) and an SRS-spatialRelationInfo ID 0 (4 bits). SRS-spatialRelationInfo ID 0 corresponds to the first SRS resource set ID indicated to be updated by the 16-bit bitmap (e.g., a "0" in the bitmap indicates that the SRS resource set ID is not to be updated, and a "1" in the bitmap indicates that the SRS resource set ID is to be updated). SRS-spatialRelationInfo ID 1 corresponds to the second SRS resource set ID indicated to be updated by the 16-bit bitmap. The fifth octet 1110 includes an SRS-spatialRelationInfo ID 3 (4 bits) and an SRS-spatialRelationInfo ID 2 (4 bits). SRS-spatialRelationInfo ID 2 corresponds to the third SRS resource set ID indicated to be updated by the 16-bit bitmap. SRS-spatialRelationInfo ID 3 corresponds to the fourth SRS resource set ID indicated to be updated by the 16-bit bitmap. SRS-spatialRelationInfo for M SRS resource set IDs may be updated as indicated the 16-bit bitmap.

In various embodiments, a MAC CE for updating spatialRelationInfo of an individual SRS resource may be reused with an additional rule. In such embodiments, if RRC is used to configure all SRS resources of an SRS resource set to share a common spatialRelationInfo, a UE may update the spatialRelationInfo of all the SRS resources within a set together if any one of the SRS resources within the SRS resource set has its spatialRelationInfo updated by RRC reconfiguration or by the MAC CE. Further, in such embodiments, the SRS resource may be part of an SRS resource set having usage set to noncodebook. A rule for applying the spatialRelationInfo to other SRS resources in other CCs according to a SimultaenousSpatialRelationCellList may also be used. If configured, SRS resources within an SRS resource set having the same ID as the SRS resource set containing an SRS resource indicated in a MAC CE in other CCs may be updated with the same spatialRelationInfo.

Figure 12:
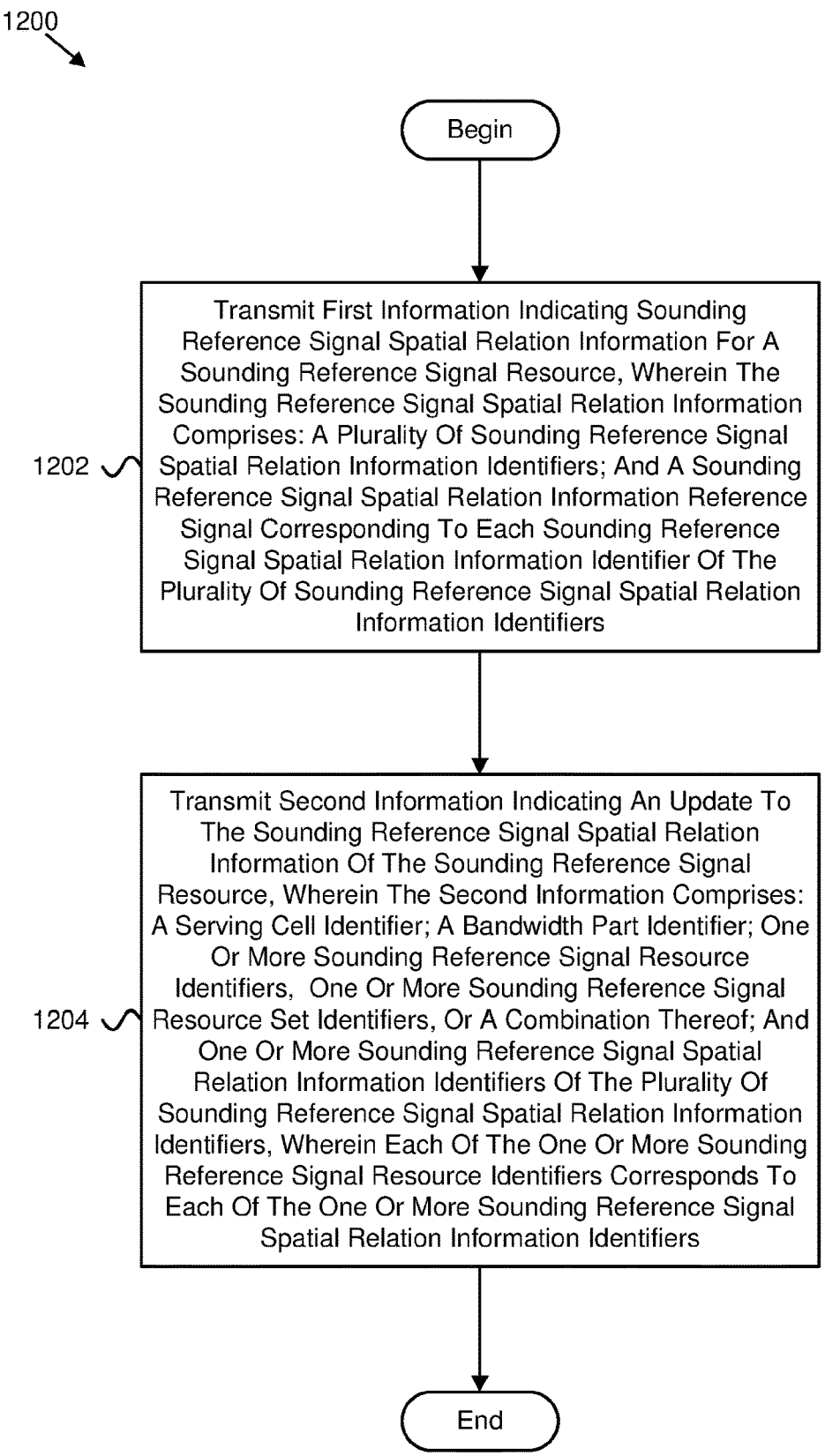
FIG. 12 is a schematic flow chart diagram illustrating one embodiment of a method for updating sounding reference signal spatial relation information.

FIG. 12 is a schematic flow chart diagram illustrating one embodiment of a method 1200 for updating sounding reference signal spatial relation information. In some embodiments, the method 1200 is performed by an apparatus, such as the network unit 104. In certain embodiments, the method 1200 may be performed by a processor executing program code, for example, a microcontroller, a microprocessor, a CPU, a GPU, an auxiliary processing unit, a FPGA, or the like.

The method 1200 may include transmitting 1202 first information indicating sounding reference signal spatial relation information for a sounding reference signal resource, wherein the sounding reference signal spatial relation information comprises: a plurality of sounding reference signal spatial relation information identifiers; and a sounding reference signal spatial relation information reference signal corresponding to each sounding reference signal spatial relation information identifier of the plurality of sounding reference signal spatial relation information identifiers. In certain embodiments, the method 1200 includes transmitting 1204 second information indicating an update to the sounding reference signal spatial relation information of the sounding reference signal resource, wherein the second information comprises: a serving cell identifier; a bandwidth part identifier; one or more sounding reference signal resource identifiers, one or more sounding reference signal resource set identifiers, or a combination thereof; and one or more sounding reference signal spatial relation information identifiers of the plurality of sounding reference signal spatial relation information identifiers, wherein each of the one or more sounding reference signal resource identifiers corresponds to each of the one or more sounding reference signal spatial relation information identifiers.

In certain embodiments, the first information is transmitted using radio resource control signaling. In some embodiments, the second information is transmitted using a medium access control control element. In various embodiments, the sounding reference signal resource is either aperiodic or semi-persistent.

In one embodiment, the method 1200 further comprises transmitting third information indicating one or more simultaneous spatial relation cell lists for updating the sounding reference signal spatial relation information using radio resource control signaling. In certain embodiments, the second information comprises the one or more sounding reference signal resource set identifiers, and each of the one or more sounding reference signal resource set identifiers corresponds to each of the one or more sounding reference signal spatial relation information identifiers. In some embodiments, the one or more sounding reference signal resource set identifiers comprises a bitmap, and each bit of the bitmap corresponds to a sounding reference signal resource set identifier of the one or more sounding reference signal resource set identifiers.

In various embodiments, the second information comprises the one or more sounding reference signal resource identifiers, the one or more sounding reference signal resource identifiers comprises a bitmap, and each bit of the bitmap corresponds to a sounding reference signal resource identifier of the one or more sounding reference signal resource identifiers. In one embodiment, the method 1200 further comprises transmitting fourth information indicating a sounding reference signal resource set, wherein each sounding reference signal resource in the sounding reference signal resource set has the same sounding reference signal spatial relation information. In certain embodiments, the sounding reference signal resource set is for noncodebook usage.

Figure 13:
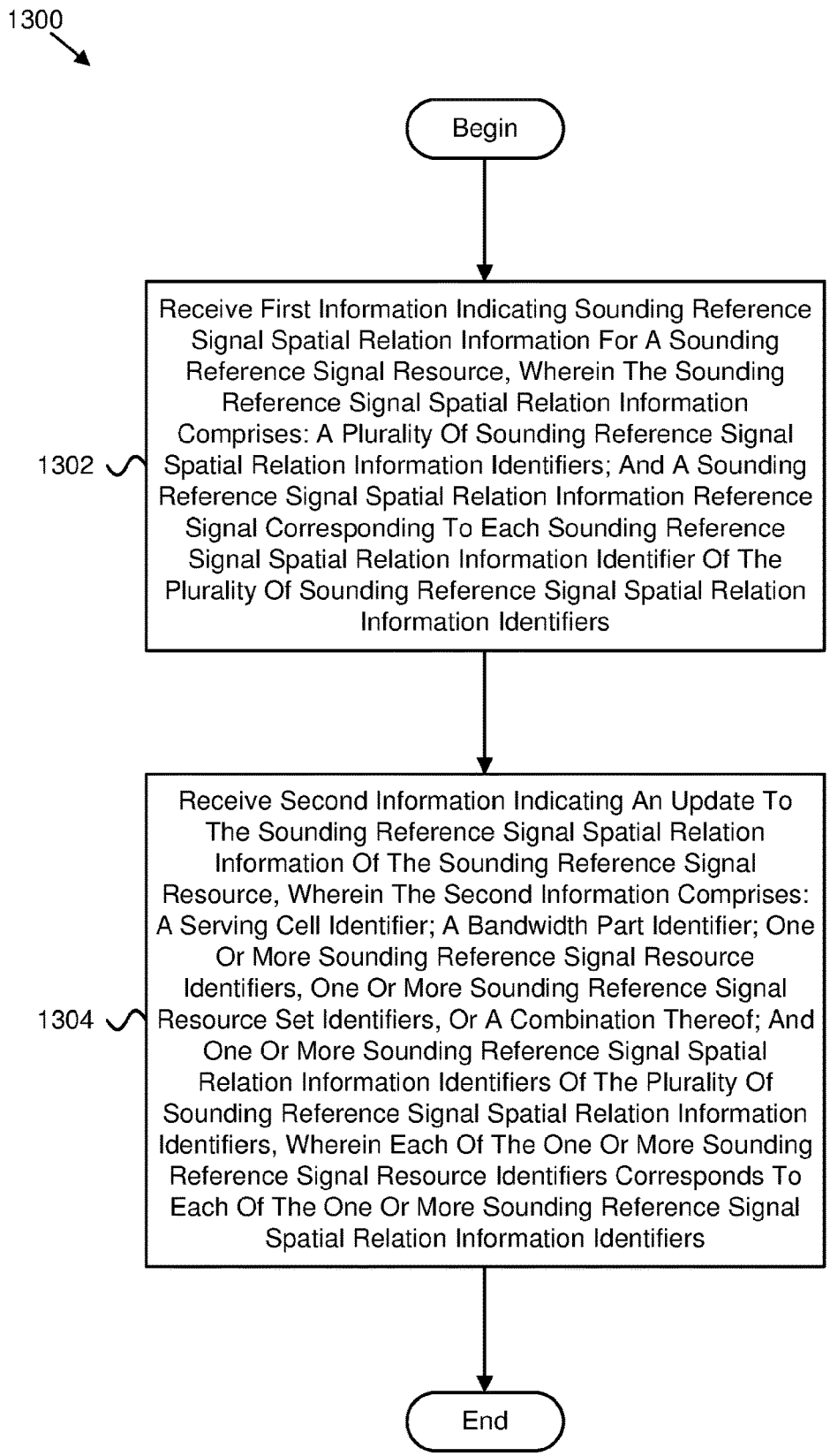
FIG. 13 is a schematic flow chart diagram illustrating another embodiment of a method for updating sounding reference signal spatial relation information.

FIG. 13 is a schematic flow chart diagram illustrating one embodiment of a method 1300 for updating sounding reference signal spatial relation information. In some embodiments, the method 1300 is performed by an apparatus, such as the remote unit 102. In certain embodiments, the method 1300 may be performed by a processor executing program code, for example, a microcontroller, a microprocessor, a CPU, a GPU, an auxiliary processing unit, a FPGA, or the like.

The method 1300 may include receiving 1302 first information indicating sounding reference signal spatial relation information for a sounding reference signal resource, wherein the sounding reference signal spatial relation information comprises: a plurality of sounding reference signal spatial relation information identifiers; and a sounding reference signal spatial relation information reference signal corresponding to each sounding reference signal spatial relation information identifier of the plurality of sounding reference signal spatial relation information identifiers. In some embodiments, the method 1300 includes receiving 1304 second information indicating an update to the sounding reference signal spatial relation information of the sounding reference signal resource, wherein the second information comprises: a serving cell identifier; a bandwidth part identifier; one or more sounding reference signal resource identifiers, one or more sounding reference signal resource set identifiers, or a combination thereof; and one or more sounding reference signal spatial relation information identifiers of the plurality of sounding reference signal spatial relation information identifiers, wherein each of the one or more sounding reference signal resource identifiers corresponds to each of the one or more sounding reference signal spatial relation information identifiers.

In certain embodiments, the first information is received using radio resource control signaling. In some embodiments, the second information is received using a medium access control control element. In various embodiments, the sounding reference signal resource is either aperiodic or semi-persistent.

In one embodiment, the method 1300 further comprises receiving third information indicating one or more simultaneous spatial relation cell lists for updating the sounding reference signal spatial relation information using radio resource control signaling. In some embodiments, the method 1300 further comprises, in response to receiving the second information and the third information, updating each of the component carriers in a simultaneous spatial relation cell list of the one or more simultaneous spatial relation cell lists based on the second information.

In various embodiments, the second information comprises the one or more sounding reference signal resource set identifiers, and each of the one or more sounding reference signal resource set identifiers corresponds to each of the one or more sounding reference signal spatial relation information identifiers. In one embodiment, the one or more sounding reference signal resource set identifiers comprises a bitmap, and each bit of the bitmap corresponds to a sounding reference signal resource set identifier of the one or more sounding reference signal resource set identifiers. In certain embodiments, the second information comprises the one or more sounding reference signal resource identifiers, the one or more sounding reference signal resource identifiers comprises a bitmap, and each bit of the bitmap corresponds to a sounding reference signal resource identifier of the one or more sounding reference signal resource identifiers.

In some embodiments, the method 1300 further comprises receiving fourth information indicating a sounding reference signal resource set, wherein each sounding reference signal resource in the sounding reference signal resource set has the same sounding reference signal spatial relation information. In various embodiments, the sounding reference signal resource set is for noncodebook usage. In one embodiment, the method 1300 further comprises updating the sounding reference signal spatial relation information of the sounding reference signal resource based on the second information.

In one embodiment, a method comprises: transmitting first information indicating sounding reference signal spatial relation information for a sounding reference signal resource, wherein the sounding reference signal spatial relation information comprises: a plurality of sounding reference signal spatial relation information identifiers; and a sounding reference signal spatial relation information reference signal corresponding to each sounding reference signal spatial relation information identifier of the plurality of sounding reference signal spatial relation information identifiers; and transmitting second information indicating an update to the sounding reference signal spatial relation information of the sounding reference signal resource, wherein the second information comprises: a serving cell identifier; a bandwidth part identifier; one or more sounding reference signal resource identifiers, one or more sounding reference signal resource set identifiers, or a combination thereof; and one or more sounding reference signal spatial relation information identifiers of the plurality of sounding reference signal spatial relation information identifiers, wherein each of the one or more sounding reference signal resource identifiers corresponds to each of the one or more sounding reference signal spatial relation information identifiers.

In certain embodiments, the first information is transmitted using radio resource control signaling.

In some embodiments, the second information is transmitted using a medium access control control element.

In various embodiments, the sounding reference signal resource is either aperiodic or semi-persistent.

In one embodiment, the method further comprises transmitting third information indicating one or more simultaneous spatial relation cell lists for updating the sounding reference signal spatial relation information using radio resource control signaling.

In certain embodiments, the second information comprises the one or more sounding reference signal resource set identifiers, and each of the one or more sounding reference signal resource set identifiers corresponds to each of the one or more sounding reference signal spatial relation information identifiers.

In some embodiments, the one or more sounding reference signal resource set identifiers comprises a bitmap, and each bit of the bitmap corresponds to a sounding reference signal resource set identifier of the one or more sounding reference signal resource set identifiers.

In various embodiments, the second information comprises the one or more sounding reference signal resource identifiers, the one or more sounding reference signal resource identifiers comprises a bitmap, and each bit of the bitmap corresponds to a sounding reference signal resource identifier of the one or more sounding reference signal resource identifiers.

In one embodiment, the method further comprises transmitting fourth information indicating a sounding reference signal resource set, wherein each sounding reference signal resource in the sounding reference signal resource set has the same sounding reference signal spatial relation information.

In certain embodiments, the sounding reference signal resource set is for noncodebook usage.

In one embodiment, an apparatus comprises: a transmitter that: transmits first information indicating sounding reference signal spatial relation information for a sounding reference signal resource, wherein the sounding reference signal spatial relation information comprises: a plurality of sounding reference signal spatial relation information identifiers; and a sounding reference signal spatial relation information reference signal corresponding to each sounding reference signal spatial relation information identifier of the plurality of sounding reference signal spatial relation information identifiers; and transmits second information indicating an update to the sounding reference signal spatial relation information of the sounding reference signal resource, wherein the second information comprises: a serving cell identifier; a bandwidth part identifier; one or more sounding reference signal resource identifiers, one or more sounding reference signal resource set identifiers, or a combination thereof; and one or more sounding reference signal spatial relation information identifiers of the plurality of sounding reference signal spatial relation information identifiers, wherein each of the one or more sounding reference signal resource identifiers corresponds to each of the one or more sounding reference signal spatial relation information identifiers.

In certain embodiments, the first information is transmitted using radio resource control signaling.

In some embodiments, the second information is transmitted using a medium access control control element.

In various embodiments, the sounding reference signal resource is either aperiodic or semi-persistent.

In one embodiment, the transmitter transmits third information indicating one or more simultaneous spatial relation cell lists for updating the sounding reference signal spatial relation information using radio resource control signaling.

In certain embodiments, the second information comprises the one or more sounding reference signal resource set identifiers, and each of the one or more sounding reference signal resource set identifiers corresponds to each of the one or more sounding reference signal spatial relation information identifiers.

In some embodiments, the one or more sounding reference signal resource set identifiers comprises a bitmap, and each bit of the bitmap corresponds to a sounding reference signal resource set identifier of the one or more sounding reference signal resource set identifiers.

In various embodiments, the second information comprises the one or more sounding reference signal resource identifiers, the one or more sounding reference signal resource identifiers comprises a bitmap, and each bit of the bitmap corresponds to a sounding reference signal resource identifier of the one or more sounding reference signal resource identifiers.

In one embodiment, the transmitter transmits fourth information indicating a sounding reference signal resource set, and each sounding reference signal resource in the sounding reference signal resource set has the same sounding reference signal spatial relation information.

In certain embodiments, the sounding reference signal resource set is for noncodebook usage.

In one embodiment, a method comprises: receiving first information indicating sounding reference signal spatial relation information for a sounding reference signal resource, wherein the sounding reference signal spatial relation information comprises: a plurality of sounding reference signal spatial relation information identifiers; and a sounding reference signal spatial relation information reference signal corresponding to each sounding reference signal spatial relation information identifier of the plurality of sounding reference signal spatial relation information identifiers; and receiving second information indicating an update to the sounding reference signal spatial relation information of the sounding reference signal resource, wherein the second information comprises: a serving cell identifier; a bandwidth part identifier; one or more sounding reference signal resource identifiers, one or more sounding reference signal resource set identifiers, or a combination thereof; and one or more sounding reference signal spatial relation information identifiers of the plurality of sounding reference signal spatial relation information identifiers, wherein each of the one or more sounding reference signal resource identifiers corresponds to each of the one or more sounding reference signal spatial relation information identifiers.

In certain embodiments, the first information is received using radio resource control signaling.

In some embodiments, the second information is received using a medium access control control element.

In various embodiments, the sounding reference signal resource is either aperiodic or semi-persistent.

In one embodiment, the method further comprises receiving third information indicating one or more simultaneous spatial relation cell lists for updating the sounding reference signal spatial relation information using radio resource control signaling.

In some embodiments, the method further comprises, in response to receiving the second information and the third information, updating each of the component carriers in a simultaneous spatial relation cell list of the one or more simultaneous spatial relation cell lists based on the second information.

In various embodiments, the second information comprises the one or more sounding reference signal resource set identifiers, and each of the one or more sounding reference signal resource set identifiers corresponds to each of the one or more sounding reference signal spatial relation information identifiers.

In one embodiment, the one or more sounding reference signal resource set identifiers comprises a bitmap, and each bit of the bitmap corresponds to a sounding reference signal resource set identifier of the one or more sounding reference signal resource set identifiers.

In certain embodiments, the second information comprises the one or more sounding reference signal resource identifiers, the one or more sounding reference signal resource identifiers comprises a bitmap, and each bit of the bitmap corresponds to a sounding reference signal resource identifier of the one or more sounding reference signal resource identifiers.

In some embodiments, the method further comprises receiving fourth information indicating a sounding reference signal resource set, wherein each sounding reference signal resource in the sounding reference signal resource set has the same sounding reference signal spatial relation information.

In various embodiments, the sounding reference signal resource set is for noncodebook usage.

In one embodiment, the method further comprises updating the sounding reference signal spatial relation information of the sounding reference signal resource based on the second information.

In one embodiment, an apparatus comprises: a receiver that: receives first information indicating sounding reference signal spatial relation information for a sounding reference signal resource, wherein the sounding reference signal spatial relation information comprises: a plurality of sounding reference signal spatial relation information identifiers; and a sounding reference signal spatial relation information reference signal corresponding to each sounding reference signal spatial relation information identifier of the plurality of sounding reference signal spatial relation information identifiers; and receives second information indicating an update to the sounding reference signal spatial relation information of the sounding reference signal resource, wherein the second information comprises: a serving cell identifier; a bandwidth part identifier; one or more sounding reference signal resource identifiers, one or more sounding reference signal resource set identifiers, or a combination thereof; and one or more sounding reference signal spatial relation information identifiers of the plurality of sounding reference signal spatial relation information identifiers, wherein each of the one or more sounding reference signal resource identifiers corresponds to each of the one or more sounding reference signal spatial relation information identifiers.

In certain embodiments, the first information is received using radio resource control signaling.

In some embodiments, the second information is received using a medium access control control element.

In various embodiments, the sounding reference signal resource is either aperiodic or semi-persistent.

In one embodiment, the receiver receives third information indicating one or more simultaneous spatial relation cell lists for updating the sounding reference signal spatial relation information using radio resource control signaling.

In some embodiments, the apparatus further comprises a processor that, in response to receiving the second information and the third information, updates each of the component carriers in a simultaneous spatial relation cell list of the one or more simultaneous spatial relation cell lists based on the second information.

In various embodiments, the second information comprises the one or more sounding reference signal resource set identifiers, and each of the one or more sounding reference signal resource set identifiers corresponds to each of the one or more sounding reference signal spatial relation information identifiers.

In one embodiment, the one or more sounding reference signal resource set identifiers comprises a bitmap, and each bit of the bitmap corresponds to a sounding reference signal resource set identifier of the one or more sounding reference signal resource set identifiers.

In certain embodiments, the second information comprises the one or more sounding reference signal resource identifiers, the one or more sounding reference signal resource identifiers comprises a bitmap, and each bit of the bitmap corresponds to a sounding reference signal resource identifier of the one or more sounding reference signal resource identifiers.

In some embodiments, the receiver receives fourth information indicating a sounding reference signal resource set, and each sounding reference signal resource in the sounding reference signal resource set has the same sounding reference signal spatial relation information.

In various embodiments, the sounding reference signal resource set is for noncodebook usage.

In one embodiment, the apparatus further comprises a processor that updates the sounding reference signal spatial relation information of the sounding reference signal resource based on the second information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:
    transmitting first information indicating sounding reference signal (SRS) spatial relation information for a SRS resource, wherein the SRS spatial relation information comprises:
        a plurality of SRS spatial relation information identifiers; and
        a SRS spatial relation information reference signal corresponding to each SRS spatial relation information identifier of the plurality of SRS spatial relation information identifiers;
    transmitting second information indicating an update to the SRS spatial relation information of the SRS resource, wherein the second information comprises:
        a serving cell identifier;
        a bandwidth part identifier;
        one or more SRS resource identifiers, one or more SRS resource set identifiers, or a combination thereof; and
        one or more SRS spatial relation information identifiers of the plurality of SRS spatial relation information identifiers, wherein each of the one or more SRS resource identifiers corresponds to each of the one or more SRS spatial relation information identifiers; and
    transmitting third information indicating one or more simultaneous spatial relation cell lists for updating the SRS spatial relation information using radio resource control (RRC) signaling.

2. A base station, comprising:
    at least one memory; and
    at least one processor coupled with the at least one memory and configured to cause the base station to:
        transmit first information indicating sounding reference signal (SRS) spatial relation information for a SRS resource, wherein the SRS spatial relation information comprises:
            a plurality of SRS spatial relation information identifiers; and
            a SRS relation information reference signal corresponding to each SRS spatial relation information identifier of the plurality of SRS spatial relation information identifiers;
        transmit second information indicating an update to the SRS spatial relation information of the SRS resource, wherein the second information comprises:
            a serving cell identifier;
            a bandwidth part identifier;
            one or more SRS resource identifiers, one or more SRS resource set identifiers, or a combination thereof; and
            one or more SRS spatial relation information identifiers of the plurality of SRS spatial relation information identifiers, wherein each of the one or more SRS resource identifiers corresponds to each of the one or more SRS spatial relation information identifiers; and
        transmit third information indicating one or more simultaneous spatial relation cell lists for updating the SRS spatial relation information using radio resource control (RRC) signaling.

3. The base station apparatus of claim 2, wherein the first information is transmitted using the RRC signaling.

4. The base station of claim 2, wherein the second information is transmitted using a medium access control control element (MAC CE).

5. The base station of claim 2, wherein the SRS resource is either aperiodic or semi-persistent.

6. The base station of claim 2, wherein the second information comprises the one or more SRS resource set identifiers, and each of the one or more SRS resource set identifiers corresponds to each of the one or more SRS spatial relation information identifiers.

7. The base station of claim 6, wherein the one or more SRS resource set identifiers comprises a bitmap, and each bit of the bitmap corresponds to a SRS resource set identifier of the one or more SRS resource set identifiers.

8. The base station of claim 2, wherein the second information comprises the one or more SRS resource identifiers, the one or more SRS resource identifiers comprises a bitmap, and each bit of the bitmap corresponds to a SRS resource identifier of the one or more SRS resource identifiers.

9. The base station of claim 2, wherein the at least one processor is configured to cause the base station to transmit fourth information indicating a SRS resource set, and each SRS resource in the SRS resource set has the same SRS spatial relation information.

10. The base station of claim 9, wherein the SRS resource set is for noncodebook usage.

11. A user equipment (UE), comprising:
    at least one memory; and
    at least one processor coupled with the at least one memory and configured to cause the UE to:
        receive first information indicating sounding reference signal (SRS) spatial relation information for a SRS resource, wherein the SRS spatial relation information comprises:
            a plurality of SRS spatial relation information identifiers; and
            a SRS spatial relation information reference signal corresponding to each SRS spatial relation information identifier of the plurality of SRS spatial relation information identifiers;

receive second information indicating an update to the SRS spatial relation information of the SRS resource, wherein the second information comprises:
a serving cell identifier;
a bandwidth part identifier;
one or more SRS resource identifiers, one or more SRS resource set identifiers, or a combination thereof; and
one or more SRS spatial relation information identifiers of the plurality of SRS spatial relation information identifiers, wherein each of the one or more SRS resource identifiers corresponds to each of the one or more SRS spatial relation information identifiers; and
receive third information indicating one or more simultaneous spatial relation cell lists for updating the SRS spatial relation information using radio resource control (RRC) signaling.

12. The UE of claim 11, wherein the first information is received using the RRC signaling.

13. The UE of claim 11, wherein the second information is received using a medium access control control element (MAC CE).

14. The UE of claim 11, wherein the SRS resource is either aperiodic or semi-persistent.

15. The UE of claim 11, wherein the at least one processor is configured to cause the UE to, in response to receiving the second information and the third information, update each component carrier in a simultaneous spatial relation cell list of the one or more simultaneous spatial relation cell lists based on the second information.

16. The UE of claim 11, wherein the second information comprises the one or more SRS resource set identifiers, and each of the one or more SRS resource set identifiers corresponds to each of the one or more SRS spatial relation information identifiers.

17. The UE of claim 16, wherein the one or more SRS resource set identifiers comprises a bitmap, and each bit of the bitmap corresponds to a SRS resource set identifier of the one or more SRS resource set identifiers.

18. The UE of claim 11, wherein the second information comprises the one or more SRS resource identifiers, the one or more SRS resource identifiers comprises a bitmap, and each bit of the bitmap corresponds to a SRS resource identifier of the one or more SRS resource identifiers.

19. A processor for wireless communication, comprising:
at least one controller coupled with at least one memory and configured to cause the processor to:
receive first information indicating sounding reference signal (SRS) spatial relation information for a SRS resource, wherein the SRS spatial relation information comprises:
a plurality of SRS spatial relation information identifiers; and
a SRS spatial relation information reference signal corresponding to each SRS spatial relation information identifier of the plurality of SRS spatial relation information identifiers;
receive second information indicating an update to the SRS spatial relation information of the SRS resource, wherein the second information comprises:
a serving cell identifier;
a bandwidth part identifier;
one or more SRS resource identifiers, one or more SRS resource set identifiers, or a combination thereof; and
one or more SRS spatial relation information identifiers of the plurality of SRS spatial relation information identifiers, wherein each of the one or more SRS resource identifiers corresponds to each of the one or more SRS spatial relation information identifiers; and
receive third information indicating one or more simultaneous spatial relation cell lists for updating the SRS spatial relation information using radio resource control (RRC) signaling.

20. The processor of claim 19, wherein the first information is received using the RRC signaling.

* * * * *